United States Patent
Fredriksson (10) Patent No.: US 8,364,875 B2
(45) Date of Patent: *Jan. 29, 2013

(54) TIME AND EVENT BASED MESSAGE TRANSMISSION

(75) Inventor: Lars-Berno Fredriksson, Kinna (SE)

(73) Assignee: Xinshu Management, L.L.C., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/238,225

(22) Filed: Sep. 21, 2011

(65) Prior Publication Data

US 2012/0072630 A1  Mar. 22, 2012

Related U.S. Application Data

(63) Continuation of application No. 12/717,822, filed on Mar. 4, 2010, now Pat. No. 8,037,226, which is a continuation of application No. 10/539,005, filed as application No. PCT/SE03/01736 on Nov. 11, 2003, now Pat. No. 7,711,880.

(30) Foreign Application Priority Data

Dec. 17, 2002 (SE) .................................. 0203756

(51) Int. Cl.
*G06F 13/36* (2006.01)
*G06F 13/362* (2006.01)
(52) U.S. Cl. ........................ 710/117; 710/118
(58) Field of Classification Search .................. 710/105, 710/107, 116–118, 123–125, 244; 713/400, 713/401, 502, 503

See application file for complete search history.

(56) References Cited

U.S. PATENT DOCUMENTS

| 4,516,239 | A | 5/1985 | Maxemchuk |
| 4,719,620 | A | 1/1988 | Machino et al. |
| 4,739,323 | A | 4/1988 | Miesterfeld et al. |
| 5,353,287 | A | 10/1994 | Kuddes et al. |
| 6,181,708 | B1 | 1/2001 | Quackenbush et al. |
| 7,711,880 | B2 | 5/2010 | Fredriksson |
| 8,037,226 | B2 * | 10/2011 | Fredriksson ............ 710/117 |
| 2004/0153682 | A1 | 8/2004 | Fuehrer et al. |

FOREIGN PATENT DOCUMENTS

| EP | 0187679 | 7/1986 |
| EP | 1017198 A2 | 7/2000 |
| WO | 9502294 A1 | 1/1995 |
| WO | 0133780 A1 | 5/2001 |
| WO | 0176148 A1 | 10/2001 |
| WO | 02076032 A2 | 9/2002 |

OTHER PUBLICATIONS

Ellims Michael, et al. "Design and Analysis of a Robust Real0Time Engine Control Network": IEEE Micro. Jul.-Aug. 2002. pp. 20-27.
Ferreira, Joaquim, et al. "The FTT-CAN Protocol for Flexibility in Safety-Critical Systems". IEEE Micro. Jul.-Aug. 2002. pp. 46-55.
Fredriksson et al. "CAN for Critical Embedded Automotive Networks", IEEE Micro, Jul.-Aug. 2002, pp. 2-9.
Fredriksson Lars-Berno. "A CAN Kingdom". Rev. 3.01. 1995. Kvaser AB.

(Continued)

*Primary Examiner* — Thomas J Cleary
(74) *Attorney, Agent, or Firm* — Brundidge & Stanger, P.C.

(57) ABSTRACT

A system, apparatus and method for efficient utilization of available band-width on the system's bus connection. The system includes a scheduler configured to receive a virtual schedule that provides at least one slot for sending a message over the communication bus and to confirm a trigger condition. A module is configured to send a message over the communication bus when the trigger condition is confirmed.

20 Claims, 8 Drawing Sheets

LEGEND
A1, A2, B1, B2, C1, C2=Messages

OTHER PUBLICATIONS

Koopman, Philip et al. "Critical Embedded Automotive Networks". IEEE Micro. Jul.-Aug. 2002. pp. 14-18.
Maier, Reinhard, et al. "Time-Triggered Architecture: A Consistent Computing Platform". IEEE Micro. Jul.-Aug. 2002. pp. 36-45.
Road Vehicles—Controller Area Network (CAN)—Part 4: Time-Triggered Communication (ISO 11898-4:2004(E). Swedish Standards Institute, Jan. 2005, 38 pages.

"TTP/C Protocol". Specification of the TTP/C Protocol. Specification version 0.1 Feb. 1, 1999. TTTech Computertechnik GMbH. pp. i-viii and 1-132.
International Search Report No. PCT/SE2003/001736, dated Feb. 13, 2004, 4 pages.

* cited by examiner

FIG. 1

LEGEND
A1, A2, B1, B2=Messages

FIG. 2

LEGEND
A1, A2, B1, B2, C1, C2=Messages

FIG. 3

LEGEND
BG=BUS Guardian
PP=Protocol Processer
HA=Requisite Hardware
C=Clock
CC=Can Controller
H', H", H'"=Hardware

FIG. 4

LEGEND
T1, T2, T3, T4, T5=Time slot
A1, A2, B1, B2, C1, Z1 =Message
dA=Clock delta in module A
dB=Clock delta in module B
dC=Clock delta in module C
dC'=Increased clock delta in module C

FIG. 5

LEGEND
A1, A2, B1, B2, C1, Z1=Messages

FIG. 6

LEGEND
A1, A2, B1, C1, Z1=Messages

FIG. 7

LEGEND
A1, A2, A3, B1, B2, C1, C2, C3=Messages

FIG. 8

TIME AND EVENT BASED MESSAGE TRANSMISSION

CROSS-REFERENCE TO RELATED APPLICATIONS

This application is a continuation of U.S. application Ser. No. 12/717,822, which is a Continuation of U.S. application Ser. No. 10/539,005, now U.S. Pat. No. 7,711,880, filed Mar. 3, 2006, which is a U.S. national phase application filed under 35 U.S.C. 371 of International Application PCT/SE03/01736 filed Nov. 11, 2003, designating the United States, which claims priority from Sweden Application 0203756, filed on Dec. 17, 2002.

FIELD

The present invention relates to a distributed control or monitoring system with an arrangement in a control, monitoring and/or vehicle system that comprises locally distributed module units (nodes) carrying out one or more functions and links connecting one or more units, with the respective module unit being connected to the relevant link via a connection arrangement or a connection point and requisite communication device, preferably for the protocol CAN.

BACKGROUND

The CAN-system (Control Area Network) is currently well-known in various connections for controlling, processes, monitoring, etc. Among other things, it is used in various vehicle applications in order to control various processes in the vehicle. In addition, it is used for function control in machinery, for example within the construction industry, in weaving sheds, etc. In connection with this, reference can be made to the patent literature and the patent applications and patents that have been submitted and obtained by the Applicant of the present patent application.

In connection with control and monitoring systems of this type, there is an ongoing need to make the system as such more efficient, to improve it and to make it cheaper. A bottleneck for system performance is the bandwidth of the bus. To date, most systems based on CAN have been constructed on the basis that messages are sent event-driven. This means that the bus is poorly utilized and that the time for message transfer varies greatly. This fact has resulted in CAN generally being considered to be unsuitable for safety-critical systems. Such systems should be based on time-controlled scheduling of message transfers between the nodes in the system. Special protocols for this have been developed, for example TTP and Flexray. A new standard for CAN with support for time scheduling is in preparation by ISO ("Controller area network (CAN) B Part 4: Time-triggered communication" ISO/CD 11898-4) which proposes how CAN messages can be time scheduled and how clocks for this can be arranged. An overview and discussion of the subject is published in the publication IEEE Micro July-August 2002. TTP can be considered best to correspond to the current technology concerning distributed systems with high real-time and security requirements. This is a modern, advanced and well-documented protocol for time-controlled systems that are used in vessels. For detailed information, refer for example to H. Kopetz, "TTP/C Protocol", TTTech 1999. A study of TTP/C shows that it makes high demands to the effect that the clocks in the respective modules must operate within a high given tolerance and that special circuits must be used, so-called Bus Guardians, in order to ensure that no module transmits messages that collide with other messages on the bus. In general, serial protocols are divided into three classifications: Collision Avoidance (CA), Collision Detection (CD) and Collision Resolution (CR). Definitions of the classifications and the boundaries between them can vary. TTP is a typical CA protocol, that is all measures and steps are taken in order to avoid collisions. This is a generally accepted starting point for traditional time-controlled systems. The Ethernet is a good example of a CD protocol. Collisions normally arise on the bus and are detected. Colliding messages are discarded and the transmitters send the messages again after a delay. The protocol has rules concerning this delay so that at least the modules that collided do not immediately collide again. The collisions thus give rise to reduced bandwidth and mean that the maximum delay for a given message can not be calculated and guaranteed. CAN is an example of a CR protocol. Collisions are resolved in a predictable way. The price of this characteristic is a low maximum bandwidth and this is one of the reasons that CAN has been considered not to be a suitable protocol for time-controlled systems. In addition, the collision-resolving characteristic has been considered by most experts not to be of value for time-controlled systems, as collisions are not supposed to occur.

Figure 1:
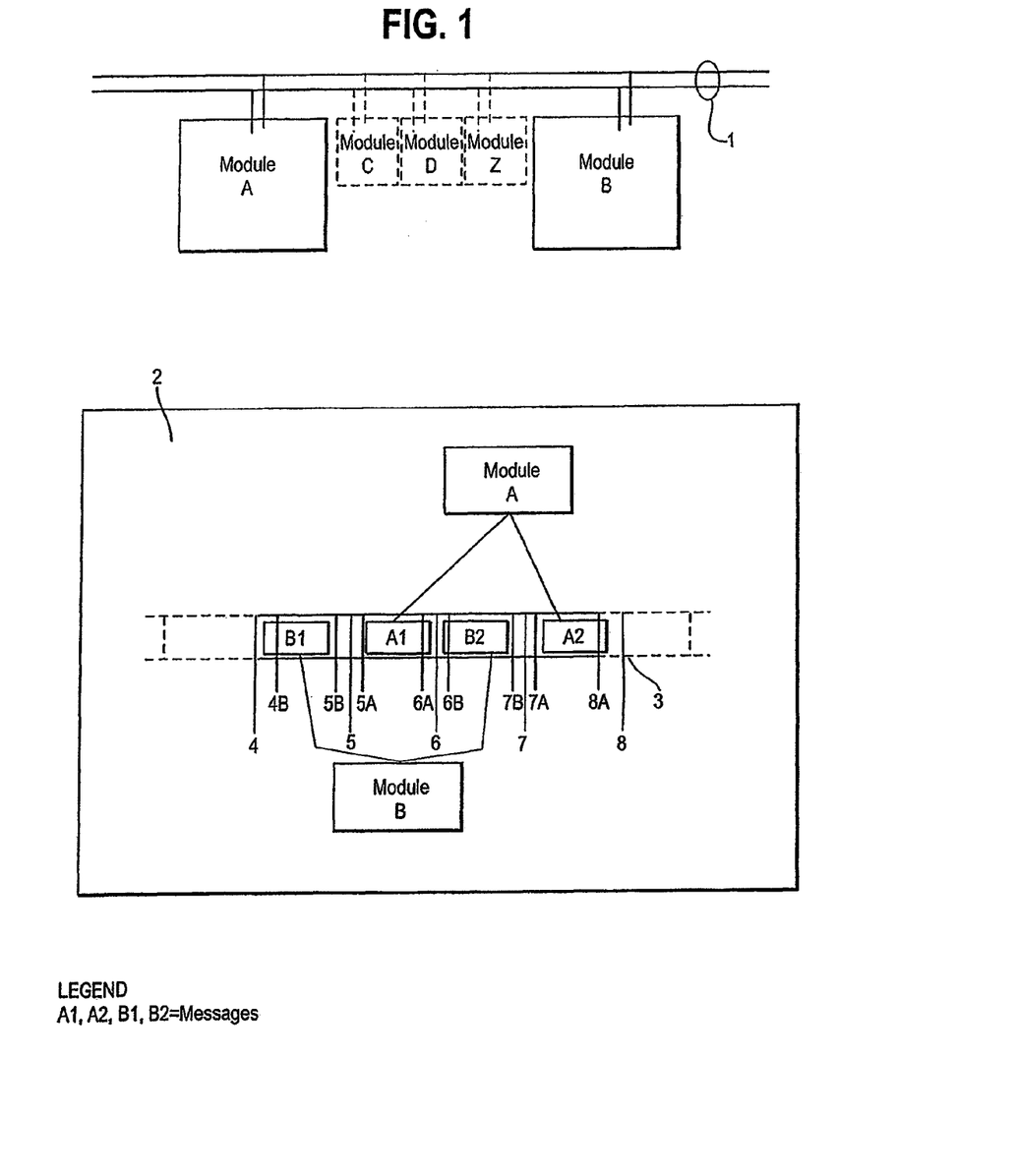
FIG. 1 shows schematically a CAN system with the nodes A and B and additional nodes C, D and Z and a traditional scheduling of some messages from A and B.

Traditionally, time-scheduled transmission of messages is considered to be more efficient than event-driven transmission. However, the time slot that is allocated to a message must be longer than the message in order to take account of the difference between the modules' clocks. FIG. 1 shows schematically a traditional schedule with time slots in which the modules A and B place their messages. As their clocks are not precisely synchronized with the system clock, the messages are placed in practice slightly earlier or later in the allocated time slot than what is specified by the scheduling. This means that in traditional time-controlled systems the allocated time slot must be large in order for inaccurate clocks to be able to be used in the modules, which results in loss of bandwidth, or means alternatively that very accurate clocks must be used, which results in high costs. The present invention aims to solve this problem, among others. In addition, immediate retransmission of discarded messages is not permitted in traditional time-scheduled systems as this would require longer time slots. Extract from ISO 11898-4: "Arbitrating time window conflicts are resolved by the identifier arbitration of CAN and a CAN node may not start transmission if the bus is not idle. Several CAN nodes in the network may start a transmission within the Tx_Enable window of an arbitrating time window. The immediate automatic retransmission is disabled". The quotation shows that it is a widespread belief that automatic retransmission should not occur at all in CAN-based time-controlled systems and that a node is not to request start of message transmission of the bus if the bus is not expected to be free. The present invention aims, among other things, to allow immediate retransmission of discarded messages. A characteristic of the invention is that a CAN node starts transmission when the bus is engaged (not idle).

Time-scheduled communication requires each node to keep time within a given accuracy in relation to the system clock and requires each message to be transmitted/received in a given time slot for the respective message. This leads to the communication being sensitive to interference and to additional bandwidth having to be kept in reserve in order that important messages will be certain to get through in time. A further development of the basic idea of the invention avoids this need and makes possible the construction of a very robust communication system with predictable characteristics. A communication system can be constructed by means of the invention, that has the respective advantages of event-driven and time-controlled communication while at the same time eliminating their respective disadvantages. A robust communication system with great adaptability to the requirements of the total system and with "graceful degradation" characteristics can be constructed by means of the invention.

In accordance with the concept of the invention, the problems described above are solved by utilizing the known characteristics of a CAN message and by the introduction of new concepts such as virtual and actual schedules and virtual system clock. The invention is applicable to other protocols than CAN that have the utilized CAN characteristics.

SUMMARY

The principal characteristics of an arrangement according to the invention are apparent from the characterizing part of the following claim 1.

In the simplest form of the invention, the protocol utilizes CAN's characteristic that, in the event of a collision, the message that has commenced transmission is not terminated, but the colliding message waits until the bus is again free and then immediately commences the transmission. A practically 100% utilization of the bus bandwidth is obtained with the following method:

1. A virtual time schedule is set up where each message, at least those that are to be found under normal operating conditions, is allocated a time in accordance with a virtual clock at which the transmission of the message is to commence in ideal conditions. The time slot for the start of transmission for the next message can be set to a value that must be larger than the average length of the message, measured in time.

2. Each module is allocated an actual schedule, related to an actual clock in the module, for the transmission of messages. The time for transmission is set earlier than the time allocated in the virtual schedule.

3. The actual clocks in the modules are set in relation to the virtual clock.

4. The transmissions commence.

The method above shows a basic idea of the invention. First, there is a scheduling in relation to an ideal, virtual clock, where each message is given a time slot in which it can be transmitted without colliding with another message. By this means, it is ensured that the bandwidth is sufficient for transmitting the required information. The next problem is to make this scheduling work in practice. There are many ways to set up a global time in a system. In traditional time-synchronized systems, it is necessary that all modules in the system have a common time base related to a common clock, at least at each given moment in time. An unorthodox solution is described in Chapter 6.2 in CanKingdom version 3.01, where a message triggers transmission of another message and it is thereby possible to achieve a form of time-scheduled transmission without a common time base. Variants of these methods are discussed in the article "CAN for Critical Embedded Automotive Networks" in IEEE Micro July-August 2002 on page 33 under Time schedules. In a system constructed according to the invention, the different nodes can base their time on different references and can be synchronized in various ways. The only thing that a system designer must ensure is that in one way or another each node is set in relation to the time of transmission and reception of messages within a given tolerance in relation to the virtual clock and that part of the virtual schedule that relates to the respective node. A common factor relating to solutions in accordance with traditional time-scheduled communication is that transmission attempts are commenced when the bus is free. This means that there are gaps in the communication. By means of instead deliberately starting the transmission in the previous time slot, the collision-detecting mechanism will ensure that the message is sent as soon as this is possible, and in this way the highest possible bandwidth utilization is obtained. This idea deviates radically from current thinking, and requires clarification. In current thinking, it is taken as fundamental that absolute time constitutes the basis for the length and position of the time slots, not the time a message takes up on the bus. The schedule is based on the common, ideal system time and all practical deviations from this must be taken into account in the schedule by means of the messages being allocated larger time slots than the time they take up for transmission. Drifting of the respective local clocks means that the deviation between them increases with time. By instead looking at the actual time that a message takes up and letting the schedule vary in relation to the common, ideal system time, the messages can be packed closer together in the scheduling. The time that the respective messages take up on the bus varies very little between the different modules. This new way of thinking also means that the actual schedule will oscillate depending upon how long "pre-ignition" is set, the length of the messages, the deviation of the local clocks from the virtual ideal time and the presence of empty time slots. Maximum tolerance is achieved if the nominal time for transmission is set to half the previous time slot according to the virtual schedule and if the maximum deviation between the virtual clock and the clocks of the transmitting and receiving modules is less than half the time slot for the message. A receiving module then interprets a message that is started within the previous time slot according to the virtual schedule and is ended within the current time slot as belonging to the current time slot. In this way, by means of setting the tolerance for the actual schedule instead of the tolerance for the appearance of the message within the schedule, a more efficient utilization of the available bandwidth is achieved, while retaining the advantage of time-scheduled systems that the identity of the message can be determined by where it appears in the schedule. If the CAN protocol is used, the "pre-ignition" must be reduced by at least one bit time in order to ensure that the arbitration function does not come into effect in the event of a collision.

By providing each message with a unique identity, a redundancy in the communication is obtained that can be utilized in various ways. If the communication is designed in such a way that messages are normally to be found in given time slots, then it is easily detected if such is not the case. This is described in the article "CAN for Critical Embedded Automotive Networks" in IEEE Micro July-August 2002. Another way of utilizing this solution is to deliberately let messages try to be transmitted in time slots on each side of the allocated time slot. This can be carried out by allowing there to be a greater deviation from the virtual clock than a half time slot. Messages will then change places, but as they have an identity, this does not matter. It is true that the receiver has to be prepared to receive several messages and sort out the correct one, but the number of possibilities is limited in advance and the requisite bandwidth is ensured in advance.

Many protocols, including CAN, utilize so-called "bit stuffing" in order to synchronize the bit flow. In the case of CAN, the number of stuffing bits can vary from zero up to 24% of the number of bits in the original message. In a traditional time-controlled system, a time slot would be required that was 24% longer than the nominal length of the message. With the solution proposed in the invention, where the time slots are allowed to vary in length, the margin can be reduced to 12%. Alternatively, the time slots can be determined by the nominal message length and empty recovery slots can be inserted into the schedule in order to compensate for the stuffing bits.

There is a prevalent belief among experts in the field concerning time-scheduled systems that retransmission of discarded messages cannot take place. In the original CAN protocol, it is laid down that a discarded message is to be retransmitted automatically. In later versions of the standard, it is stated that this function need not be implemented and the reason for this is that there is a desire also to use CAN in time-controlled systems. The traditional solution to the problem is to increase the updating frequency by two or three times in order to compensate for lost messages. This leads to a very poor utilization of the bandwidth. In connection with CAN, it has been proposed that a time slot that is twice or three times as long should be allocated to the message and that one or two retransmissions should be permitted. The second and third time slot are allocated to messages with lower priority. This provides a considerably better utilization of the bandwidth, but has the disadvantage that one or two messages can be lost. By letting the actual time schedule vary, by utilizing non-discarding collision detection with immediate transmission after the cessation of the collision and error signalling and by utilizing a unique identity for each message as described above, now also utilizing the CAN characteristic that each identity is associated with a unique priority and that a discarded message is immediately retransmitted depending on its priority, it is possible elegantly and efficiently to solve the problem of achieving more efficient utilization of the bandwidth. By allowing the automatic retransmission and co-ordinating the allocated time slot with the message's priority, the characteristics of the communication can be tailored according to the requirements of the total system. If the previous message has a higher priority than the next one, the previous message will go out onto the bus immediately in the event of retransmission. Lost messages will conflict with subsequent messages in the same way. If all the following messages have lower priority, a retransmission will result in the following messages being displaced by one time slot. If the following message has higher priority than the discarded message, then the discarded message will not go out until there is a message with lower priority or until the bus becomes free. In normal circumstances, discarded messages seldom occur. It is considered in general that if there is more than one discarded message in 1000, then that is an indication of a system problem. With the proposed invention, it is therefore possible in practice to obtain practically 100% bus utilization with a short and easily predictable waiting time for each message.

By designing the system so that it allows messages to change position in the virtual schedule within given limits, it can be permitted that alarm messages are transmitted not according to schedule, even if practically all the available bandwidth is utilized for the normal communication.

In traditional time-controlled systems, great importance is placed upon there being a physical reference clock (master clock) in the system and upon all clocks being set in relation to this. See, for example, the standard ISO 11898-4, referred to above. With the proposed invention, this problem can be simplified considerably. The virtual clock does not exist physically, but the local physical clock in the respective node can be set in relation to the virtual clock in many ways. In its simplest form, this is carried out simply by utilizing the ever-present internal clock in the CAN Controller which is used for bit coding according to the Non-Return-to-Zero concept. If, for example, it is determined that the virtual clock is zero when message A1 in module A is transmitted, then this can be used as reference for module B by instructing this to transmit its message B1 when the message A1 has been received. B1 can be used as a reference for the virtual clock for module C, and so on. In this way, modules without special clock-function can be integrated into the system. In this way, a module D with a primitive clock can also be integrated into the system by instructing it to transmit message D1 50 ms after it has received A1 and to transmit D2 10 ms after B2, etc. It can be seen that, in this way, module schedules can be created simply in modules that are not designed for time-controlled systems and that considerable redundancy can be incorporated. The module A can be related to an actual clock with high accuracy, for example GPS, and in this way the whole system can be kept within small tolerances. It can also be seen that systems can be constructed with a hierarchy of virtual clocks and that complex systems can be constructed which are in principle time-controlled, but in which many, and in the extreme case all, of the modules in the system in reality do not have physical module clocks. The virtual clocks are tools to help the system designer to develop communication according to principles for time-controlled systems and thereby make his system fulfill stringent real-time requirements. The actual schedule is constructed by programming the respective modules to transmit their messages in suitable relation to the virtual schedule. As is shown by the examples, there are many ways of achieving this by utilizing the characteristics of CAN which were originally developed to solve other problems.

A detailed description of the invention in accordance with what follows shows how the bus connection is utilized more efficiently and how lower requirements are imposed on the clock function in the respective module, or alternatively how it is completely replaced by utilizing one or more previous messages as triggers for transmission attempts.

BRIEF DESCRIPTION OF THE DRAWINGS

A currently proposed embodiment of an arrangement that has the significant characteristics of the invention will be described below, with reference to the attached drawings in which.

DETAILED DESCRIPTION

FIG. 1 shows schematically a network with the modules A and B connected to a few-core serial connection 1. The network can contain additional connected modules which have been indicated by C, D and Z. Each module can transmit and receive messages. The transmission of messages is time-scheduled. This scheduling is symbolized by 2, where 3 shows how messages appear on the few-core connection, consecutively in time. The time is divided into time slots and the starting points for the respective slots are indicated by 4, 5, 6, 7 and 8. According to traditional scheduling, each module is now allocated smaller slots. Module A receives 5A to 6A for the message A1 and 7A to 8A for the message A2. In the same way, module B receives 4B to 5B for B1 and 6B to 7B for B2. Now the clocks in A and B are not synchronized, for which reason the messages A1, B1, A2 and B2 in reality come within the nominal slots 4-5-6-7-8 but not according to the allocated slot. In the figure, the clock in A runs slower than the clock in B, for which reason the gap between A1 and B1 becomes greater than the gap between A1 and B2. During the scheduling, buffer zones 5B-5A, 6A-6B, etc, must be inserted between the messages in order that these will not collide as a result of the relative deviations between the module clocks. In the example described above according to traditional thinking, the actual correct time is taken as the starting point and buffer zones are scheduled in order to compensate for local deviations from the correct time.

Figure 2:
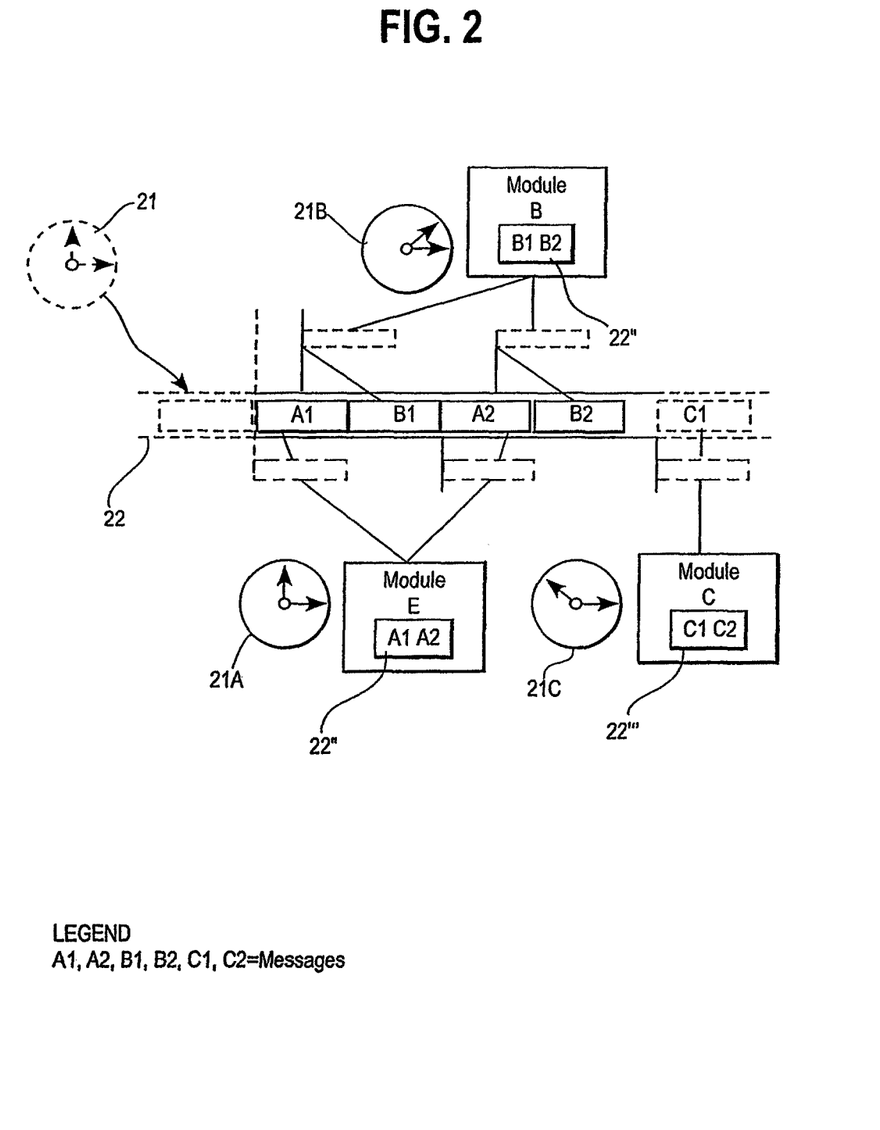
FIG. 2 shows time slots in a virtual schedule with associated virtual clock and how the modules insert their messages in accordance with their actual clocks.

FIG. 2 now shows the new thinking. The scheduling is carried out against a virtual clock. In the virtual schedule 22, the messages A1, B1, C1, A2, B2, C2, etc, are now inserted at the required times. In FIG. 2, the messages have been tightly packed for the sake of clarity. The times of transmission of the respective messages are transmitted to the respective modules. Locally each module thus receives an actual schedule for its messages: A receives an actual schedule for messages A1 and A2, B for B1 and B2 and C for C1 and C2. Each module has an actual clock which is set in relation to the virtual clock, 21A, 21B, and 21C respectively, to which their schedules are related. Now the clock 21A happens to coincide with the virtual clock and the message A1 is sent out at the correct time. The clock in B runs fast and attempts to transmit before the transmission of A1 is completed. The collision detection in CAN means that B1 is retained automatically until A1 is finished and is then sent out immediately. In spite of the fact that the clock 21B is wrong, the message will be sent out correctly according to the virtual schedule. In the same way, the messages A2 and B2 will be sent out correctly. The clock 21C is slow, so that a gap is created between B2 and C1. This would have been able to be prevented if the actual local schedules had been put forward in relation to the virtual schedule, that is if there was deliberate scheduling for collision. In traditional thinking, the schedule is stationary in time while the messages oscillate (jump forward and back) in time. With the new thinking, the whole of the actual schedule will oscillate in time.

Figure 3:
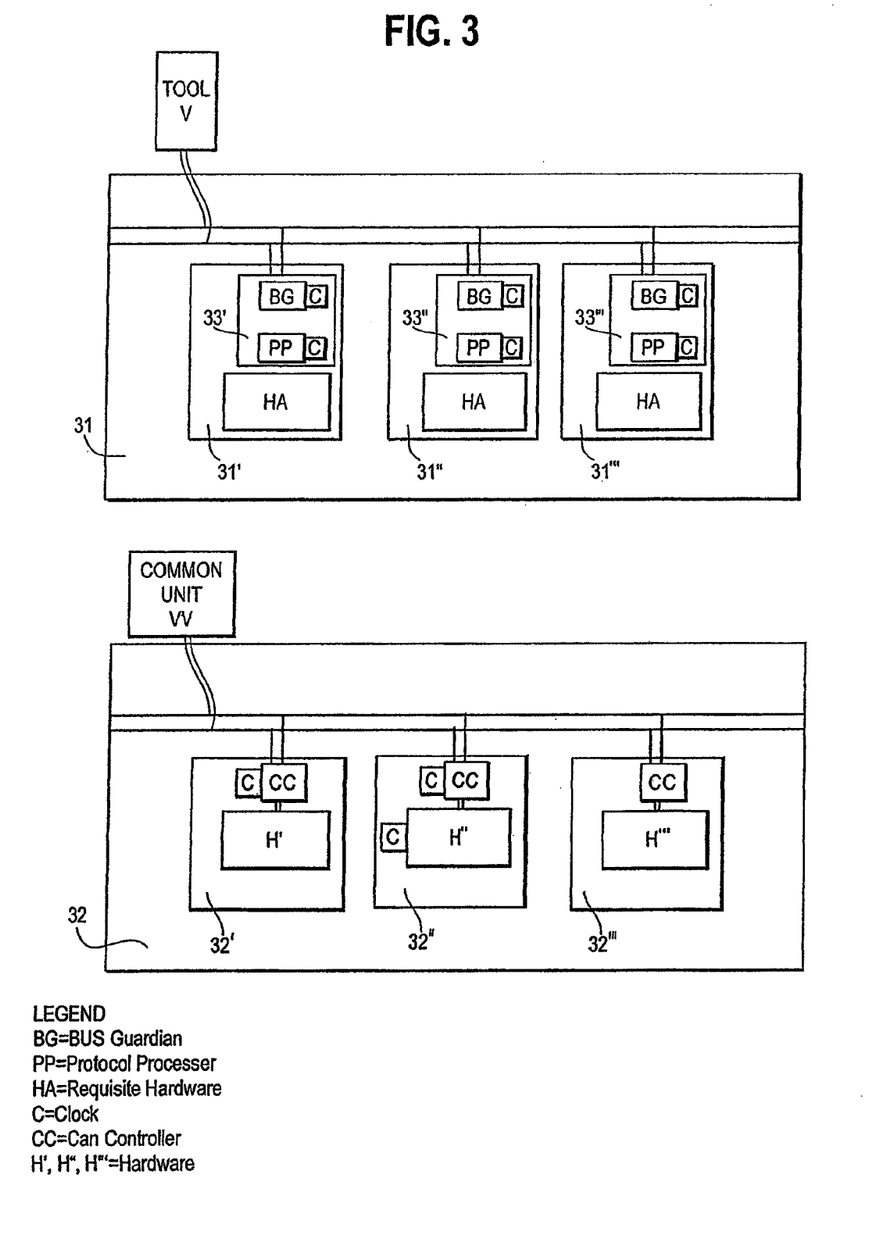
FIG. 3 shows a traditional system operating with TTP and a corresponding system operating with the invention.

FIG. 3 shows schematically a system 31 with the protocol TTP/C and an identical schematically drawn-up system 32 according to the invention with the protocol CAN. The TTP system has the modules 31', 31" and 31''' which are connected to the bus. Each module has a usual application with requisite hardware, symbolized by HA, and the communication between these is carried out via the communication units 33', 33" and 33'''. These communication units are specially developed for TTP and contain a protocol processor with associated ROM data, symbolized by PP and two Bus Guardians designated BG (only one is illustrated). Each PP and PG has a clock, symbolized by C. The description of TTP is greatly simplified, but the key feature for the comparison between TTP and a system according to the invention is the existence and placing of clocks. TTP is based on the correct time being maintained. Therefore PP and BG each have their own clocks. PP handles the transmission and reception of messages according to a time schedule. BG has a smaller part of this schedule, namely at which times the module is entitled to transmit. Only at these times can PP physically send signals on the bus. At other times BG prevents this. The time schedule is constructed by a system designer outside the system and this is downloaded to the system using a tool, symbolized by the unit V. TTP requires the special communication units which provide a common time in the system and check that messages are transmitted at the correct times and that message collision is avoided. In contrast to this is shown the system 32 according to the invention. Each module has also an application with hardware, H', H" and H'''. The communication is carried out according to the CAN protocol and standard circuits for this are used in the modules 32" and 32'''. The module 32' is assumed to have a CAN controller specially developed for the system according to the invention, with an integrated clock. The module 32" has a clock that is handled by the application, while 32''' does not have a clock at all. As for TTP, a system designer constructs scheduling for the system, but this is broken down and modified for each module, which receives a local schedule. These local schedules can be completely different in essence, but taken as a whole they form a well co-ordinated schedule for the system. The local schedules are downloaded to the respective modules from a common unit symbolized by VV. This can be temporarily or permanently connected to the system, or alternatively can be incorporated as a module in the system which has other tasks in addition to the scheduling of messages.

Figure 4:
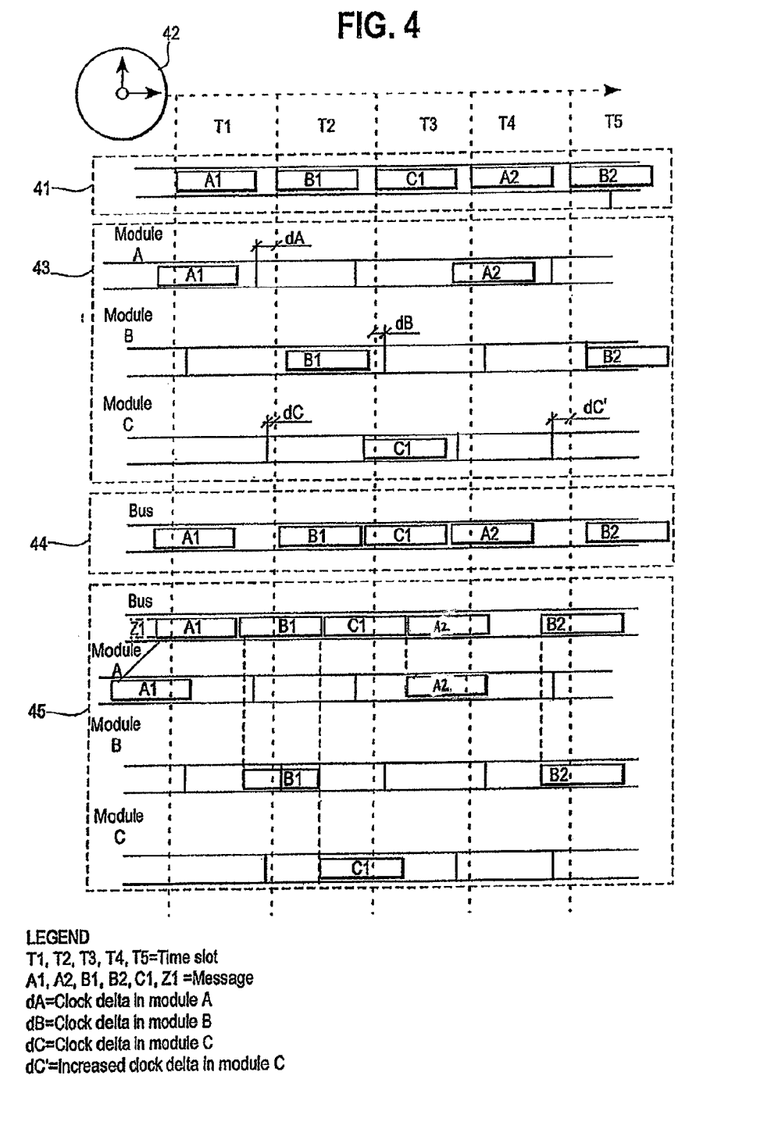
FIG. 4 shows a virtual schedule, applicable for all the following examples, an actual schedule in a respective module and resulting actual schedule on the bus for all modules for scheduling according to traditional principles. In addition, it shows resulting actual schedules from the use of the invention without pre-ignition and a comparison of the two methods.

FIG. 4 shows schematically a virtual schedule represented by 41. This is created with a virtual clock 42 which generates a continuous timing whereby the time slots T1, T2, T3, T4, T5, etc, are defined. The required transmission of the messages A1, B1, C1, A2 and B2 which are to be sent from the respective modules A, B and C in the system have been inserted in these time slots. The messages do not occupy the whole of the time slots as the virtual time is interpreted by an actual clock in the respective modules. These all deviate from the virtual time. Each module will have an actual schedule for transmission of its messages, which is illustrated by 43, and these schedules will deviate from each other as a result of the clocks' deviations from the virtual clock. 43 shows that the clock in the module A is fast by the amount dA but runs at the same speed as the virtual clock. The clock in the module B is slow by the amount dB and runs at the same speed as the virtual clock. The clock in the module C is correct at the start but runs slightly too quickly, for which reason the deviation gradually increases which is indicated by dC and dC'. Each module transmits in accordance with its actual schedule and the resulting actual schedule for the system as a whole which appears on the bus is shown by 44. Here it can be seen that there are slots of varying sizes between messages and thereby a poor utilization of the bandwidth. The messages B1 and C1 almost collide and will do so at the next occasion unless their clocks are adjusted relative to the virtual clock before then. If the module clocks keep poor time, they must be synchronized frequently via synchronization messages, which steals bandwidth. This bandwidth loss can be reduced if the modules are provided with more accurate clocks, which makes the module more expensive.

In order to avoid the requirement for accurate clocks, the CAN characteristic is utilized to resolve collisions of messages without discarding and to deliberately put forward the transmission in the module schedules. This is shown in 45. Here the respective messages have been scheduled to be transmitted almost 50% in the previous time slot according to the virtual schedule. The module A starts its transmission even earlier, as its clock is fast. The transmission of message Z is carried out in this time slot and the message A1 will not go onto the bus until this is completed. In the example shown, this is carried out at the same time as A1 goes out onto the bus in the example 44. The module B attempts to send its message almost 50% in the time slot T1 but, as its clock is slow, the message A1 has already been sent and a small time slot arises between A1 and B1. In the same way, C sends out C1 and, on account of the relative effects of the clock deviations, C1 goes out onto the bus immediately upon the attempt at transmission. A2 goes out immediately thereafter, while there is a larger slot to B2.

In both examples, we have used the same virtual schedule as the starting point. With the traditional method, the highest possible bandwidth has been utilized. With the new method, large margins have been created and the messages are sent more quickly.

Figure 5:
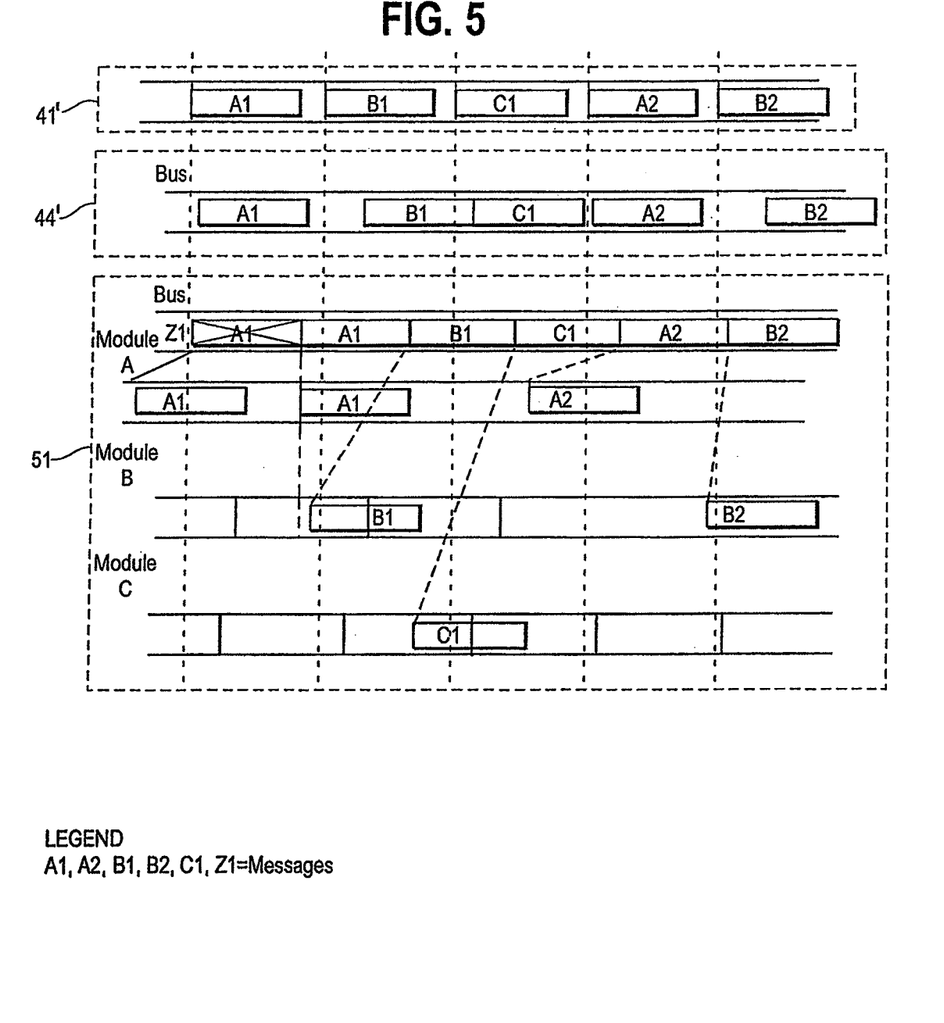
FIG. 5 shows corresponding actual schedules with pre-ignition and a discard bus with retransmission of messages in comparison with a non-discard bus according to the traditional solution.

In FIG. 5, the same virtual schedule has been utilized as above and is illustrated by 41'. The example 51 shows that automatic retransmission can be utilized. It is assumed that the message A1 in the example 45 has been discarded just before it was terminated and that it is sent again. The correct message goes out immediately after the corrupt message A1'. (This ignores components not directly affected by the invention in the CAN protocol's error handling such as error frames, etc, for which is only required a time analysis during the scheduling, which is simple for experts in the field and which does not affect the fundamental discussion and the result in the main.) The module B starts its transmission according to schedule with pre-ignition, but as A1 has already then started, B1 will go out onto the bus immediately after A1 irrespective of their relative priorities. In the same way, C1 goes out immediately after B1 and thereafter A2. A comparison with the traditional, maximally utilized schedule shows that, in spite of the retransmission of A1, B2 goes out earlier by means of the invention. Both better utilization of the bandwidth and shorter maximum delay of messages have been achieved.

Figure 6:
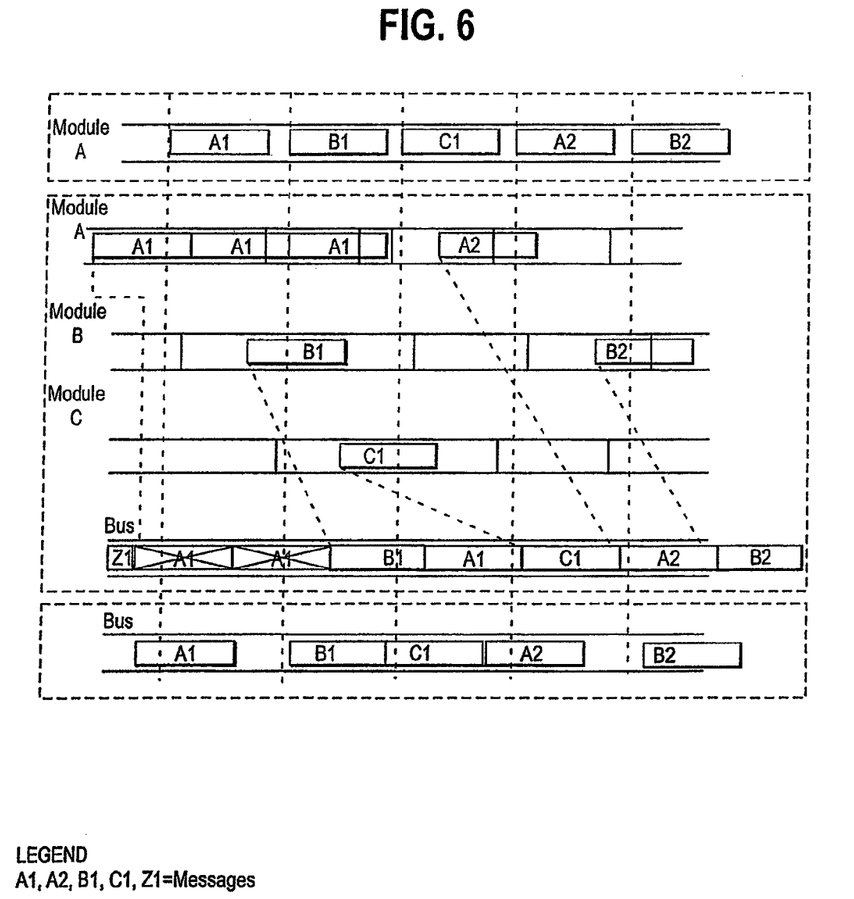
FIG. 6 shows corresponding actual schedules for a high-discard bus with retransmission of messages in comparison with a non-discard bus according to the traditional solution.

FIG. 6 shows the same case as in FIG. 4, but in which A1 is retransmitted twice and this results in a temporary 100% bus utilization, but in spite of this B2 goes out slightly delayed. In this example, it has been assumed that B1 cannot be delayed, for which reason it has been given a higher priority than A1. After two failures of almost complete A1 messages, B1 goes out with a small delay, after which the correct A1 goes out, followed by C1 and A2.

Figure 7:
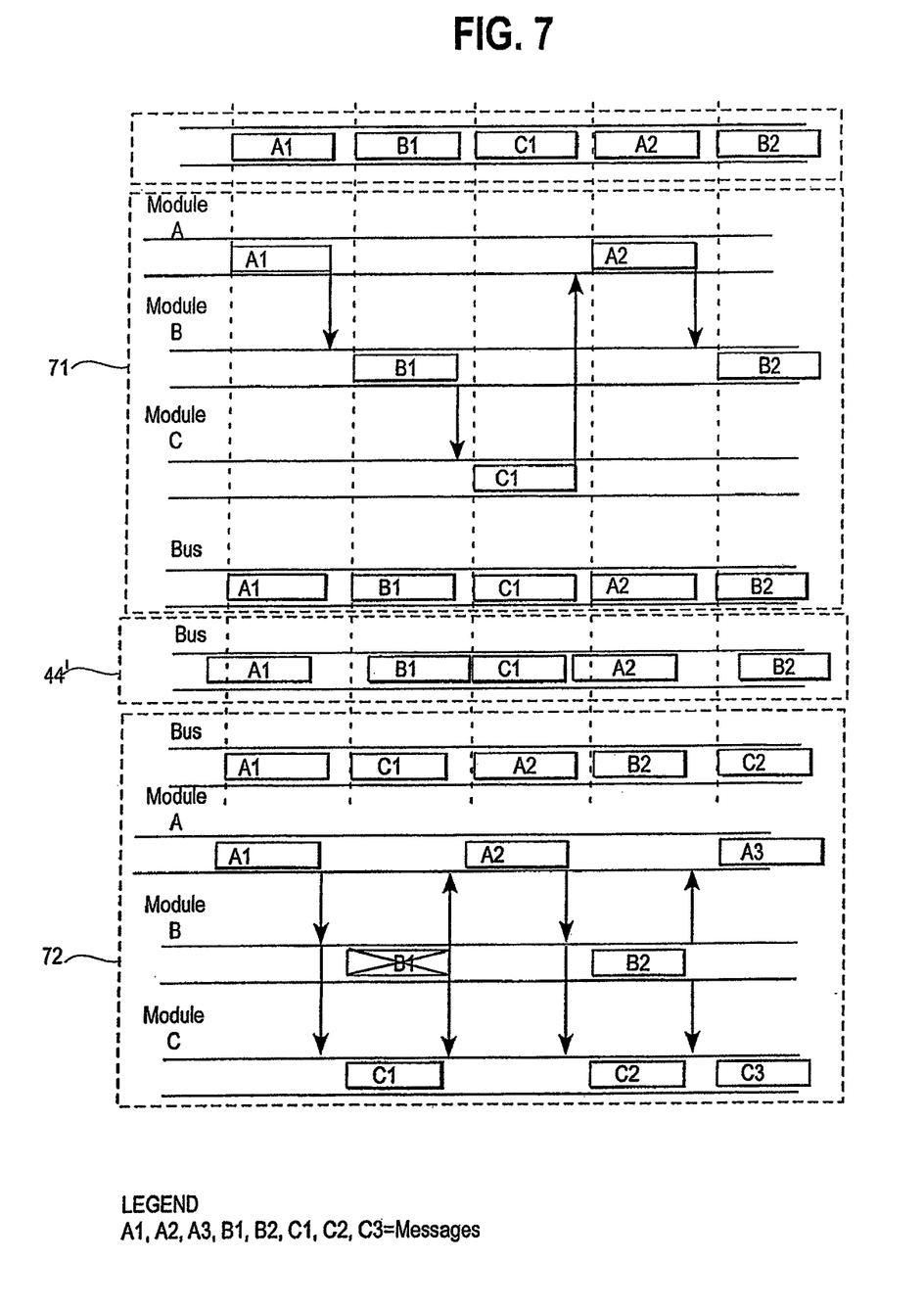
FIG. 7 shows corresponding actual schedules where a message is set in relation to the virtual clock and where other messages are indirectly set in relation to the virtual clock by the respective messages being the trigger for one or more other messages.

FIG. 7 shows how a time-scheduled communication can be set up with modules without clocks. Here the module A is co-ordinated with the virtual clock and with the modules B and C via the messages A1 and A2. In addition, it shows how redundancy is achieved by means of one message triggering several messages.

The example 71 shows in principle the same virtual scheduling as above. In this case, the fact has been taken into account that there is a certain delay after a message has been received correctly by a module before this triggers a transmission of a message by the module in question. Here the message A1 is set in relation to the virtual clock. In the module B, the message B1 is set to be sent when A1 is received and in the module C, the message C1 is set to be sent when B1 is received. In the module A, A2 is set to be sent when C1 is received. As is shown by the figure, the messages go out onto the bus better synchronized than with the use of the traditional method represented by 44". It can easily be seen that the method has a disadvantage in that one omitted message can stop all further transmission. In order to overcome this problem, each message is allocated two or more messages that trigger transmission. This is shown in the example 72. Here A1 has been set to trigger both B1 and C1, B1 to trigger C1 and A2, C1 to trigger A2 and B2, A2 to trigger B2 and C2, and B2 to trigger A3 and C3. Now A1 fails to trigger B1 but as it also triggers C1, this goes out instead of B1. The whole schedule is thereby displaced one step to the left. This does not matter, as each message has a unique identity.

The example above shows that, using the invention, not only do we achieve a better utilization of the bus's bandwidth and the use of simpler clocks, but also that the communication can be constructed to be fault-tolerant with completely predictable maximum delays and that these can be optimized according to the system's real-time requirements by means of suitable choice of identifiers and priorities, maximum number of permitted retransmissions, choice of accuracy of the clocks in the respective modules, choice of setting in relation to the virtual clock for the respective module and message, etc, and that modules can be given special rules for how the communication is to be carried out. Taken as a whole, these rules give a predictable appearance on the bus for each message. If any module should infringe any given rule, this is easily discovered by one or more system-monitoring modules and the communication does not break down. System-monitoring nodes can always issue correcting command messages, for example according to CanKingdom, by these messages being given higher priority than other messages. Traditional methods such as "bus guardians" used in traditional time-controlled systems can be used without problems, if considered necessary.

In certain cases, it cannot be tolerated that messages are sent one or more time slots earlier than scheduled. The case described above where a displacement arises due to a node not sending its message, can be avoided by one or more modules being scheduled to send a dummy message with lower priority. If these find that they do not go out onto the bus during the first half of the time slot as a result of this being occupied, the transmission attempt is discontinued.

ISO 11898-4 is a standard for scheduling of messages in a CAN bus. The standard describes two levels for the clock function, Level 1 and Level 2. Level 1 is characterized by the total time schedule being made up of shorter partial schedules which are introduced by time synchronization messages being sent from a time master. In order to ensure that the system does not fail as a result of the time master failing, there is a complex set of rules that enable one or more reserve time masters to take over in a secure way. In addition, there is a complex set of rules in the standard for how the local clocks are to be synchronized with the time master and how the respective module is to be able to determine whether it is synchronized or not. All time measurement in Level 1 is related to the bit rate on the bus. Using the invention described, a system can be constructed with much simpler means for obtaining an identical appearance of messages on the bus, without the modules having special clock functions that are synchronized with special time masters. This can be carried out by the virtual clock being set in relation to one or more messages via a selected event, for example indication of a position of a motor's flywheel. When one or more modules indicate this position, this triggers the transmission of a special message. If this message is identical for all the modules that send it, it will be understood as being owned by all the modules that send it out within the first bit, Start Of Frame. If the deviation is larger than one bit length, the message will be put in a queue in the losing module. A local time-out terminates the transmission attempt after a time that is shorter than the length of message after the indication. An alternative to this is to put the first message in the schedule after the start message at a higher priority than this. The start messages that are in a queue will then lose out in the arbitration which makes it possible to let the application in the respective module terminate the transmission attempt after the receipt of the start message. Subsequent messages can then be scheduled with the start message as a reference to a local clock which is started upon the receipt of the start message or by using some later message in the schedule as a clock reference or by using one or more previous messages in the schedule which directly trigger the transmission attempt in the way described above.

By means of the invention, the problem with the scheduling is changed from following rules laid down that require all the modules to be synchronized with a given time master in the system or with a given set of rules applicable for all the modules for obtaining timing that is common to the system for a planned virtual scheduling which is converted in practice by local rules in each module which are co-ordinated in a design process which is unique for the system. By this means, the characteristics of the system can be optimized both with regard to cost and features, by means of, among other things, eliminating the earlier basic rule that messages must not collide on the bus in time-scheduled systems. In addition, modules without clocks can be integrated into systems based on time-scheduled communication.

Many time-controlled communication systems rely on a selected edge in the bit flow on the bus for the synchronization of the local clocks within the system. CAN utilizes falling edges for hard and soft synchronization of the clocks that are used for the synchronization of the time for interpreting the individual bits in the bit flow on the bus. The first edge, SOF, is often proposed to be used for clocks for other purposes, for example for scheduling of messages. However, in order to distinguish this falling edge from a falling edge caused by an interference, SOF is not indicated until at the sampling point. ISO 11898-4 (TTCAN) utilizes this delayed indication of SOF in order to distinguish easily false edges from real ones. A disadvantage of this method is that the distance between the edge and the sampling point can be different in different modules within the system, which leads to an inexact synchronization of the clocks. This can, however, be corrected easily at local level if, for the clocks' synchronization, reference is made to the edge and not to the sampling point, as this local deviation is known in the respective nodes.

For the invention, it is, on the other hand, an advantage to utilize the sampling point as a reference. In this way, it is possible easily to integrate modules that are developed for event-driven CAN systems in time-controlled systems. When the message two time slots before is correctly received, the transmission trigger is set to be activated at the next SOF. When SOF in the message in the preceding time slot is detected, then the CAN controller is activated for transmission. As the message has then already passed the arbitration stage, it will be sent immediately after the preceding message has been terminated, irrespective of the message's priority. In this way, a module without a clock can be set in relation to a virtual clock and a virtual schedule with a high degree of precision.

It can easily be seen that if the method above is combined with a suitable choice of priorities, then several messages can have one and the same trigger message and also each message can have several trigger messages and in normal circumstances the messages will go out at the correct time. If any message is not sent, for example due to a module fault, then all the other messages will still go out, displaced, however, by one time slot.

An alternative to using the sampling point as a reference is to use the falling edge in the RTR bit after the CAN identifier. This is indicated by all the CAN Controllers for soft synchronization and is thereby just as precise as SOF but has the advantage of being reliably identified.

Figure 8:
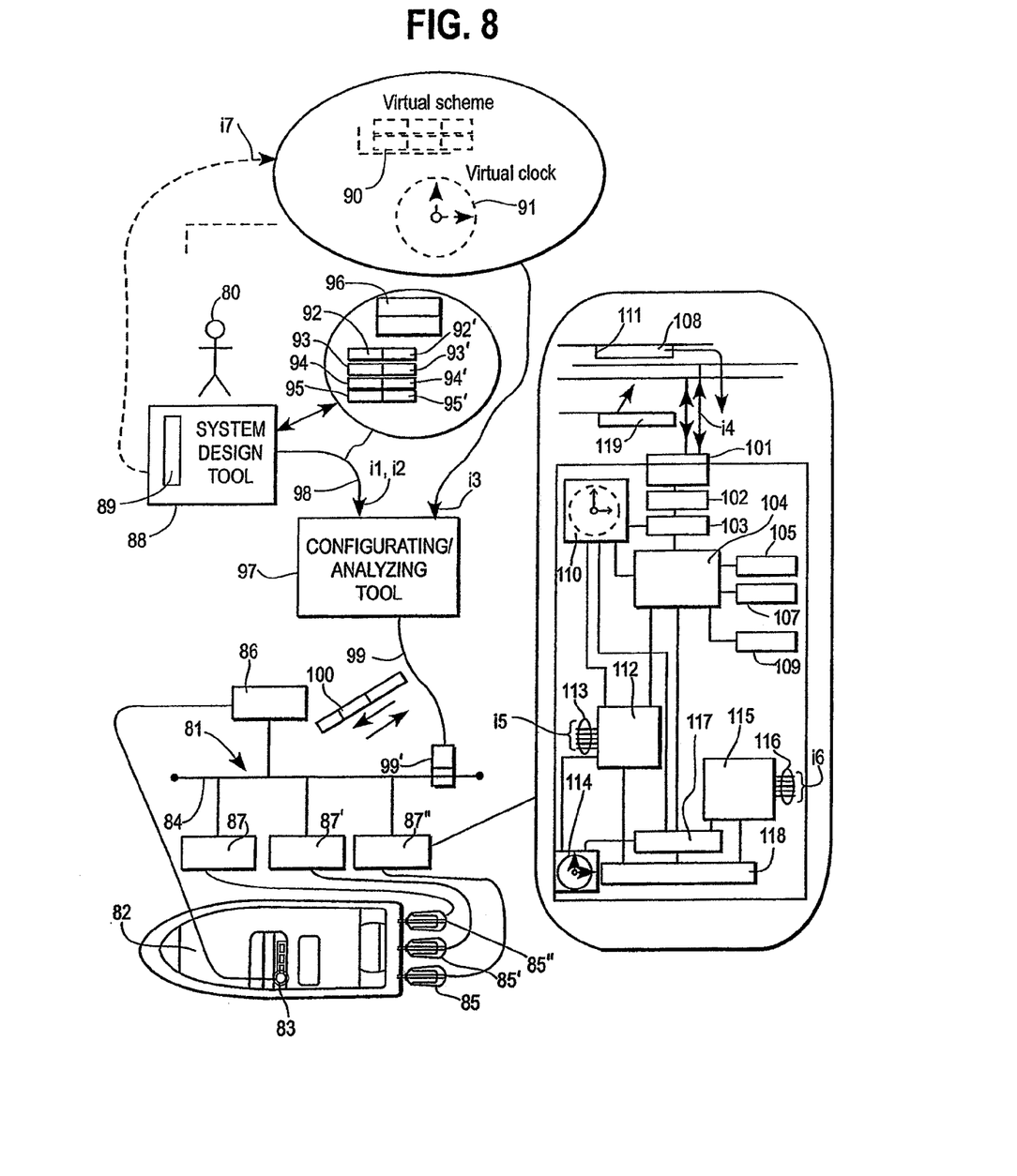
FIG. 8 shows the construction of the system in the form of a schedule.

FIG. 8 shows schematically how the construction of a system according to the invention can be carried out. A system designer 80 designs a control system 81 to be used in a product, for example a boat 82. In the example, the system consists of a boat control unit 83 which communicates, via a bus 84, with three motors with associated auxiliary devices for course setting, raising and lowering of rigging, logs, etc, 85, 85' and 85". The control electronics for the boat control unit 83 are represented by 86 and for the respective motors by 87, 87' and 87". The system designer builds up the system in a computer-based tool 88 which can be of a type according to U.S. Pat. No. 7,188,162, issued Mar. 6, 2007, and U.S. Patent Application Publication No. 2005/0086382 A1, published Apr. 21, 2005. In addition to a selection of characteristics that are described in the documents referred to, the tool has also a part 89 for scheduling according to the invention. In a first step, the system designer develops one or more virtual schedules 90 based on one or more virtual clocks 91 for the system as described above. The tool processes the virtual schedule into one or more local actual schedules for the respective modules which are indicated by 92, 93, 94 and 95. What is important for the invention is that the schedule is associated with the correct choice of identifier and their associations with each other and their priority in the event of collision on the bus, for which reason this has been marked specially by 92', 93', 94' and 95'. The tool supplies additional information i1 for settings, program codes, etc, for the respective module which is indicated by 96. The information i2 thus created and processed is transferred to a configuring tool 97 via the connection 98 which can be selected in a suitable way, for example via a diskette, file transfer in a digital network, etc. In addition to configuring the system, the information can be used for later analysis of the same and the configuring tool can advantageously be combined with an analysis tool which, among other things, can compare the virtual schedule with the actual schedule which appears on the bus during the system's operation. The configuring tool is connected to the system's bus via the connection 99 and the connector 99' and requisite information 100 for local schedules, settings, etc, is exchanged between the modules and the tool. The virtual schedule function can also convey direct information i3 to the configuration tool 97 for requisite processing.

101 shows schematically the functions comprised in the respective module. The module is connected to the bus via a connector 101 which can be a contact or a wireless connection, for transferring the bus signals i4 to and from the module. The signals pass through signal-adapting means 102, for example a CAN transceiver, which in turn is connected to a protocol circuit 103, for example a CAN Controller. This is connected to a CPU 104 with requisite peripherals and application software 105 for the module function. In addition, the module has at least software 107 which can set received messages 108 on the bus in relation to messages 109 which are to be sent. The module has an actual clock 110 which is set in relation to at least one edge on message signals on the bus, for example the falling edge 111 at Start of Frame in a CAN message. In its simplest form, the clock 110 consists of the clock incorporated in a CAN Controller for bit synchronization and interpretation. The module can be arranged to handle time-controlled means symbolized by the unit 112 and the outgoing and incoming signal connections 113. The controls i5 can be related to the clock 110 and/or a clock 114 with a second time base, for example a time base that varies with the engine speed. The module can also be arranged to handle event-driven or event-controlling means symbolized by the unit 115 and the outgoing and incoming signal connections 116. Signals i6 from events or triggering of events are co-ordinated with the time-related signals i5 and with the actual schedule (the actual schedules) in the module and with the messages' identities according to the arrangement 117 and 118. Activities in the module trigger transmission of a message 119 on the bus according to the actual schedule which collides with the message 108. If the collision takes place in Start of Frame then, if it has a higher priority than 108, the module's message will appear on the bus instead of the message 108. The sender of message 108 will receive 119 and then again commence transmission of 108. If 108 has the highest priority, the module will wait until 108 has been received and then send 119. If SoF has already been received, then the module waits to send 119 until 108 has been received. The transfer or exchange of information or signals between the virtual schedule and the system tool is symbolized by i7.

The invention is not limited to the embodiments described above, but can be modified within the framework of the following patent claims and concept of the invention.

What is claimed is:

1. A system, comprising:
   a plurality of modules connected to a communication bus, at least one of the plurality of modules comprising a scheduler configured to receive a virtual schedule that provides at least one slot for sending at least one message over the communication bus;
   wherein the at least one of the plurality of modules is configured to:
      confirm a trigger condition, and
      send the at least one message over the communication bus in response to a confirmation of the trigger condition.

2. The system of claim 1, wherein the scheduler is coupled to at least one virtual clock and further configured to determine a virtual time for sending at least one prior message according to the virtual schedule.

3. The system of claim 2, wherein the at least one of the plurality of modules is further configured to send the at least one prior message according to the virtual time.

4. The system of claim 1, wherein the confirming the trigger condition comprises receiving at least one prior message over the communication bus.

5. The system of claim 4, wherein the at least one of the plurality of modules is further configured to send at least one other message over the communication bus in response to the confirmation of the trigger condition.

6. The system of claim 5, wherein the at least one message and the at least one other message are sent to different modules of the plurality of modules.

7. The system of claim 1, wherein the communication bus is configured to operate according to a controller area network (CAN) protocol.

8. An apparatus, comprising:
   a scheduler configured to receive a virtual schedule and to confirm a trigger condition for sending at least one message in relation to the virtual schedule, wherein the virtual schedule includes at least one slot for sending the at least one message over a communication bus; and
   a transmitter configured to send the at least one message in response to a confirmation of the trigger condition and to transmit the at least one message associated with the at least one slot.

9. The apparatus of claim 8, wherein the scheduler is further configured to determine a virtual time for sending at least one prior message in relation to the virtual schedule.

10. The apparatus of claim 9, wherein the transmitter is further configured to send the at least one prior message according to the virtual time.

11. The apparatus of claim 8, wherein the trigger condition includes at least one prior message being received over the communication bus.

12. The apparatus of claim 11, wherein the transmitter is further configured to send at least one further message over the communication bus in response to the confirmation of the trigger condition.

13. The apparatus of claim 12, wherein the at least one message and the at least one other message are sent to different modules of a plurality of modules.

14. The apparatus of claim 8, wherein the communication bus is configured to operate according to a controller area network (CAN) protocol.

15. A method, comprising:
   confirming a trigger condition for sending at least one message based on a virtual schedule, wherein the virtual schedule comprises at least one slot for sending the at least first message over a communication bus; and
   transmitting the at least one message from a module over the communication bus in response to a confirmation of the trigger condition, wherein the transmitting begins inside the at least one slot for sending the at least one message.

16. The method of claim 15, wherein the trigger condition includes at least one prior message being received over the communication bus.

17. The method of claim 16, further comprising sending at least one other message over the communication bus in response to the confirmation of the trigger condition.

18. The method of claim 17, wherein the at least one message and the at least one other message are sent to different modules of the plurality of modules.

19. The method of claim 15, further comprising:
   determining a virtual time according to at least one virtual clock for sending at least one prior message based on the virtual schedule.

20. The method of claim 19, further comprising:
   transmitting the at least one prior message over the communication bus according to the virtual time.

* * * * *

UNITED STATES PATENT AND TRADEMARK OFFICE
CERTIFICATE OF CORRECTION

PATENT NO. : 8,364,875 B2  Page 1 of 1
APPLICATION NO. : 13/238225
DATED : January 29, 2013
INVENTOR(S) : Fredriksson It is certified that error appears in the above-identified patent and that said Letters Patent is hereby corrected as shown below:

In Fig. 3, Sheet 3 of 8, delete "PP= Protocol Processer" and insert -- PP= Protocol Processor --, therefor.

Signed and Sealed this
Twentieth Day of May, 2014

Michelle K. Lee
*Deputy Director of the United States Patent and Trademark Office*